(12) United States Patent
Youssefzadeh et al.

(10) Patent No.: US 11,285,831 B1
(45) Date of Patent: Mar. 29, 2022

(54) MATRIX SWITCHES FOR OPTIMIZING RESOURCE UTILIZATION IN LARGE-SCALE CHARGING STATIONS WITH DISTRIBUTED ENERGY RESOURCES

(71) Applicant: WattEV, Inc., El Segundo, CA (US)

(72) Inventors: Emil Youssefzadeh, Palos Verdes Estates, CA (US); Marcelo Barros, Ladera Ranch, CA (US); Salim Youssefzadeh, Redondo Beach, CA (US)

(73) Assignee: WattEV, Inc., El Segundo, CA (US)

( * ) Notice: Subject to any disclaimer, the term of this patent is extended or adjusted under 35 U.S.C. 154(b) by 11 days.

(21) Appl. No.: 17/320,934

(22) Filed: May 14, 2021

(51) Int. Cl.
| | |
|---|---|
| *B60L 53/30* | (2019.01) |
| *B60L 53/14* | (2019.01) |
| *H02B 1/20* | (2006.01) |
| *H02B 1/052* | (2006.01) |

(52) U.S. Cl.
CPC ............ *B60L 53/30* (2019.02); *B60L 53/14* (2019.02); *H02B 1/052* (2013.01); *H02B 1/20* (2013.01); *H02B 1/207* (2013.01)

(58) Field of Classification Search
None
See application file for complete search history.

(56) References Cited

U.S. PATENT DOCUMENTS

| | | | |
|---|---|---|---|
| 3,914,562 A * | 10/1975 | Bolger | B60L 5/005 191/10 |
| 10,263,413 B2 * | 4/2019 | Gellert | H02J 7/0031 |
| 10,654,363 B2 * | 5/2020 | Hourtane | B60L 53/14 |
| 2013/0169038 A1 * | 7/2013 | King | H02J 7/00308 307/10.1 |
| 2020/0164755 A1 * | 5/2020 | Smolenaers | B60L 53/16 |
| 2020/0298722 A1 * | 9/2020 | Smolenaers | B60L 53/24 |
| 2021/0028641 A1 * | 1/2021 | Ilic | H02J 7/00304 |

* cited by examiner

*Primary Examiner* — Courtney L Smith
(74) *Attorney, Agent, or Firm* — John R. Kasha; Kelly L. Kasha; Kasha Law LLC

(57) ABSTRACT

A DC matrix power switch structure mechanically and electrically connects m DC power modules to n charge dispensers for charging electric vehicles. The matrix includes an input structure having m conducting input busbar pairs and an output structure having n conducting output busbar pairs. A first busbar of n output busbar pairs is connected to a positive voltage terminal and a second busbar of n output busbar pairs is connected to a negative voltage terminal of each of n charge dispensers, producing two times m×n busbar crossing points. A power switch is mechanically mounted to a cross point or is moved to a crossing point and, when activated, connects to the associated busbar at the busbar crossing point providing power to the appropriate charge dispenser. A power switch includes one or more actuators to connect an input busbar to an output busbar with a flexible conductor.

10 Claims, 13 Drawing Sheets

MATRIX SWITCHES FOR OPTIMIZING RESOURCE UTILIZATION IN LARGE-SCALE CHARGING STATIONS WITH DISTRIBUTED ENERGY RESOURCES

INTRODUCTION

The teachings herein relate to electric vehicle charging. More particularly, the teachings herein relate to systems and methods for optimizing resource utilization in large-scale charging stations with distributed energy resources.

Problems with Large-Scale Charging Stations

An electric vehicle (EV) charging station is an integrated system that supplies electric energy to recharge plug-in electric vehicles, including electric cars and trucks, neighborhood electric vehicles, and plug-in hybrids. It is also called an EV charging station, electric recharging point, charging point, charge point, electronic charging station (ECS), or electric vehicle supply equipment (EVSE).

Electric vehicle manufacturers, charging infrastructure providers, and regional governments have entered into many agreements and ventures to promote and provide electric vehicle networks or public charging stations. The principal suppliers and manufacturers of charging stations offer a range of options, including simple charging posts for roadside use, charging cabinets for covered parking spaces, and fully automated charging stations integrated with power distribution equipment.

Typically, public charging stations are on-street facilities provided by electric utilities. Facilities are often located at retail shopping centers, restaurants, or parking places and utilize the existing ubiquitous electric grid supplied by the local utility for power.

The current design of grid-connected EV charging stations using Fast DC Chargers involves (a) a transformer to bring down the three-phase voltage to 480V AC, (b) multiple cabinets of AC/DC converters that receive AC power from the transformer and output DC power, (c) underground DC cabling from each cabinet to one or two charge dispenser locations, and (d) a charge dispenser at each charge dispenser location with a charging cable and connector for attachment to the EV. With two or more charge dispensers connected to the converter cabinet, power fed to each dispenser is dynamically allocated from the converter as needed between the charge dispensers.

As heavy-duty EV trucks are introduced to the transportation market, next-generation truck stops providing rapid simultaneous electric refueling of multiple EVs with different battery capacities are critical to the emerging EV trucking industry. Each next-generation truck stop can have 30 or more charge dispensers of varying power from 50 KW to over 1 MW for serving light, medium, and heavy-duty vehicles with aggregate power requirements above 25 MW.

The implementation of next-generation truck stops will be more complex than simply hooking up to the electrical grid to get power to fuel EVs. Incorporating distributed energy resources (DER system) is key to building a dependable truck stop that achieves maximum energy and cost efficiency by sharing resources and minimizing energy curtailment or other uncertainties that could diminish the reliability and profitability of the truck stop. The DER system includes energy resources such as the electric utility grid, solar panels, windmills, natural gas and diesel emergency generators, and battery storage systems. Ideally, the aggregate available converter power covers peak utilization, and capacity is incrementally expandable to meet demand while maintaining the shortest average charging session.

Additional systems and methods are needed for optimizing DER system resource utilization to yield highly reliable, resilient, cost-effective, and energy-efficient large-scale next-generation charging stations.

SUMMARY

Previous systems incorporated dynamic power-sharing using fast DC chargers combined with discrete power switches in an AC charging system. The novel charging station described in this invention is an integrated energy management and control system that brings energy efficiency, cost efficiency, resiliency, and reliability to a microgrid-based EV truck stop through a combination of DER system resources and dynamic power sharing. At the heart of the novel control system is an automated centralized mechanical switch matrix. Prior art alternatives use individually actuated, discrete power switches that are not as efficient as a single automated matrix platform that opens and closes low-loss mechanical connections.

Recharging an EV equipped with a large battery pack presents a high load on a utility's stand-alone electrical grid. Proper scheduling is required to smooth electrical grid load variations and to take advantage of periods of reduced load or reduced electricity costs. Communication with the electrical grid is mandatory to reserve the time and power needed for the charge dispensers to efficiently charge the EVs.

Various embodiments of this invention accomplish the aforementioned more efficiently by connecting the electrical grid to a DER system and optimizing the DER resource utilization by using (a) a pool of standardized software-controlled DC power modules with variable output voltages, (b) a switching matrix (Matrix Power Switch or MPS) for combining and routing power from the banks of then standardized DC power modules to each charge dispenser as needed to charge the specific battery, and (c) a centralized management system for monitoring, controlling, and routing of energy between the DER system resources and the charge dispensers. Typical DER system resources include the electrical grid plus off-grid generation such as solar panels, wind turbines, emergency natural gas and diesel generators, and storage devices such as battery storage systems, including parked and unused EV fleets whose batteries individually and collectively form a storage system that can buffer the microgrid powered by the DER system.

The MPS relies on unique electromechanical implementations that provide cost savings and minimize energy loss through heat generation associated with solid-state solutions. Furthermore, the proposed electromechanical matrix switch overcomes the voltage limitations of the current state-of-the-art solid-state devices for operation under the required mid-voltage levels necessary to supply high power for heavy and medium-duty charge dispensers.

The consumption of onsite generated renewable electricity (i.e., solar, hydro, and wind) is measured and recorded by a renewal meter. To reasonably estimate solar and wind energy production as an example, a forecasting tool, either algorithm or artificial intelligence (AI) based, takes into account (a) the consumption measured by the renewal meter during the previous day; (b) the atmospheric conditions of previous days correlated with the respective renewal meter data; and (c) the preceding days and hours atmospheric forecasts. Based on these and other relevant inputs, the AI or algorithmic system produces a forecast of renewable energy production (Renewable Production Forecast), updates the forecast in small time increments, and feeds the data to the centralized management system (CMS) for control purposes.

Battery storage is another example of a critical DER system resource. It is connected in a bi-directional manner to DC converters to allow for both energy storage and extraction. The energy extracted and delivered to DER system resources or received and stored from DER system resources is measured by battery meters. The data from the battery meters are fed into the CMS for control purposes. The DC converters connected to the batteries can terminate the flow of energy or direct the energy flow from the batteries to the other DER system resources or from the other DER system resources back to the batteries.

One or more transformers attached to the electric utility grid are connected in a bidirectional manner to other DER system resources, and the energy delivered from the grid to the other DER system resources or from the other DER system resources to the grid is measured by grid meters. The data from the grid meters are fed into the CMS for control purposes. The inverters connecting DER system resources to the grid can stop the flow of energy or direct it from the grid to DER system resources or from the DER system resources to the grid.

Public DC charge dispensers are managed by a charging network system that maintains data about energy demand and consumption. Fleet operators contract with network service providers to manage the location, time, and amount of charge dispensed. Data from network system service providers include, but are not limited to, information such as the fleet vehicle battery capacity, the expected arrival time for a particular EV at a particular charge dispenser location, the expected charge energy required for the EV, and the actual energy consumed at each dispenser at a particular time. These network data are fed into the CMS for control purposes.

Normally, the energy from the DER system is delivered in a unidirectional manner to a quantity of "m" DC power modules that provide the energy to the "n" charge dispensers via an "m" by "n" MPS. The energy consumed by the "m" DC power modules is measured by charge dispenser meters, and meter data are fed back to the CMS for control purposes.

It is important to realize that the MPS is not inherently unidirectional and can deliver the energy flow in the opposite direction through the switch. The MPS is bidirectional, and energy can flow to and from the charge dispensers back through the MPS. In other words, the charge delivered to one EV can be extracted and put back into the DER system for delivery to another battery storage device.

These and other features of the applicant's teachings are set forth herein.

BRIEF DESCRIPTION OF THE DRAWINGS

The skilled artisan will understand that the drawings are for illustration purposes only. The drawings are not intended to limit the scope of the present teachings in any way.

Figure 1:
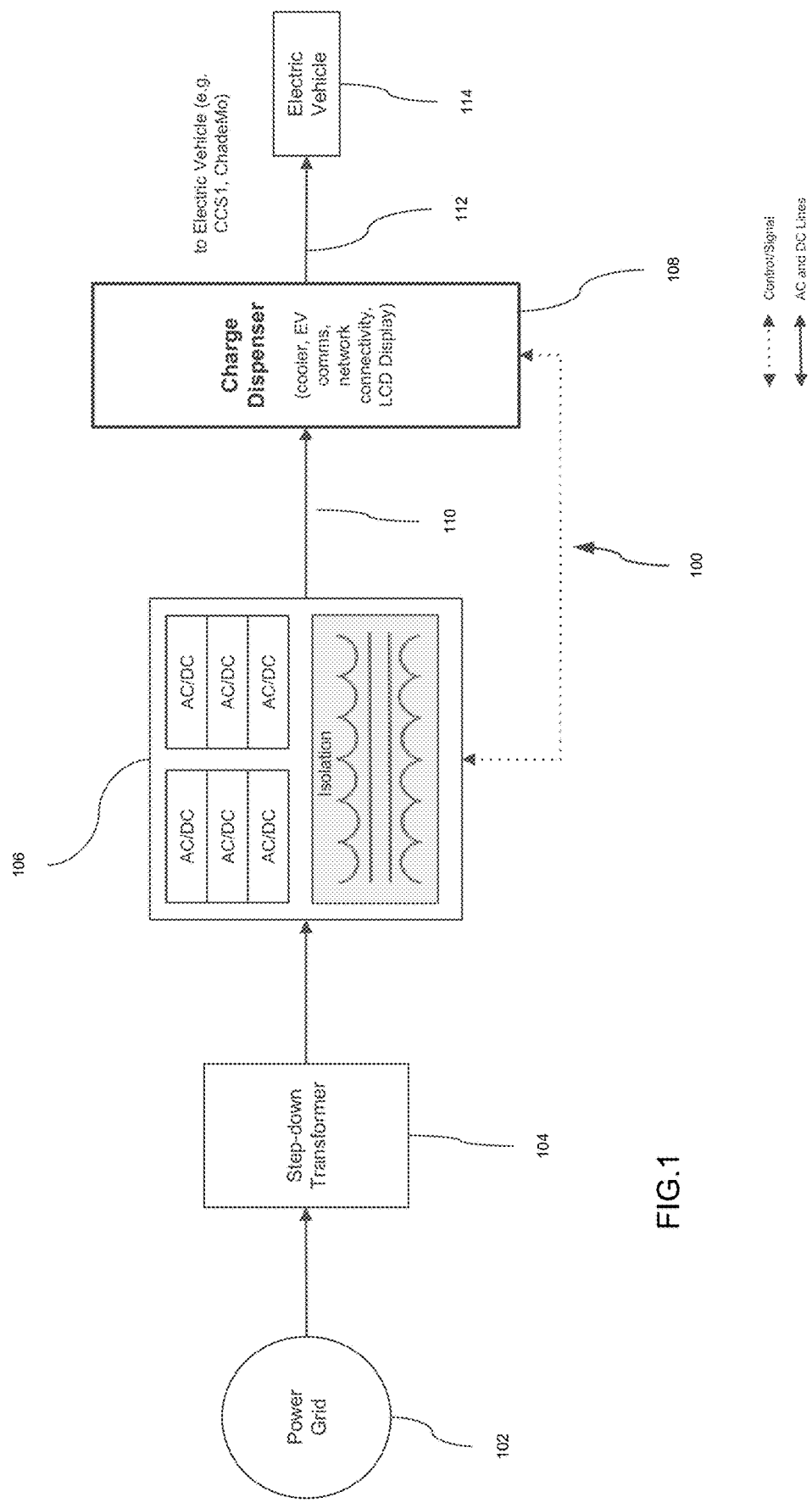
FIG. 1 shows a power grid structure in a typical resource utilization system supporting a charge dispenser for charging an EV and upon which embodiments of the present teachings may be implemented.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein are for the purpose of description and should not be regarded as limiting.

DESCRIPTION OF VARIOUS EMBODIMENTS

In FIG. 1, a typical electrical power grid structure 100 is shown within which the present teachings of the invention may be implemented. Electrical power grid structure system 100 includes a power grid 102 that delivers high voltage in three phases. The power grid 102 feeds a step-down transformer 104 to bring down the three-phase voltage to about 480 VAC. Step-down transformer 104 supplies power to a plurality of AC/DC converter cabinets 106 that in turn supply its output to a charge dispenser 108. Underground cabling 110 that can handle 50 V to 1500V and currents between 100 A to 3000 A is typically used between AC/DC converter cabinets 106 and charge dispenser 108. Although only one charge dispenser 108 is shown, those of ordinary skill in the art will understand that a plurality of charge dispensers may be employed, depending on the design demand. When a plurality of charge dispensers is used, power supplied by the converter is allocated to each dispenser. Finally, a connector 112 for charging a vehicle 114 is provided by the charging dispenser 108.

Heavy-duty EVs, such as commercial trucks, require electric charging stations that handle different battery capacities and have sufficient space and energy capacity for multiple charge dispensers to simultaneously connect and charge numerous large EVs. Each charging station may require upwards of 30 charge dispensers of varying power from 250 kW to over 1 MW that can service light, medium, and heavy-duty trucks. The aggregate power requirements in such instances may well exceed 25 MW.

Implementation of such a charging station poses challenges for optimizing the sharing of multiple DER system resources to achieve maximum energy and cost efficiency while minimizing energy curtailment. First, the aggregate converter power is designed for peak time utilization at the charging station but is incrementally expandable to meet demand while maintaining the shortest average charge session.

Figure 2:
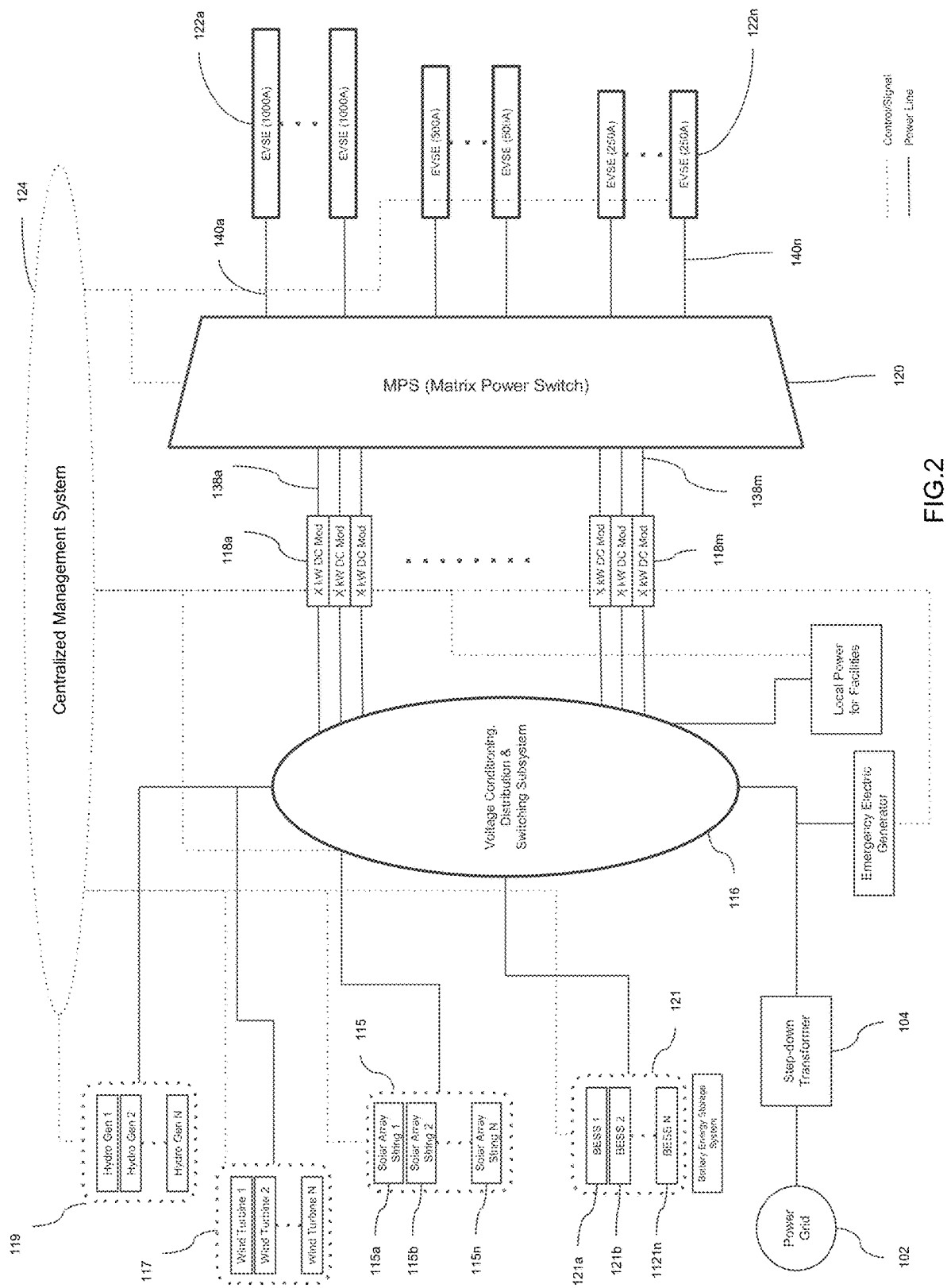
FIG. 2 shows an implementation of the present invention connected to a power grid in contrast to FIG. 1.

Referring to FIG. 2, the embodiments disclosed herein achieve the aforementioned goals by using (1) a DER system including renewable energy systems such as solar arrays 115, wind turbines 117, hydro-generators 119; battery energy storage systems (BESS) 121; emergency electric generators powered by clean natural gas or other fuels (not shown); and a connection to the local utility's electric power grid 102; (2) voltage conditioning, switching, and distributing components to integrate the resources into a single DER system to feed power to the DC power modules; (3) many standardized, software-controlled DC power modules (volume produced, low cost) 118a to 118m with variable output voltage; (4) a Matrix Power Switch (MPS) 120 for combining and routing power from banks of DC power modules 118a to 118m to charge dispensers 122a to 122n that offer outputs of varying currents (e.g., 1000A, 500A, or 250A); and (5) a centralized management system 124 for monitoring, controlling, forecasting, and routing the flow of energy between and within the DER system and charge dispensers via the MPS.

Solar array 115 supplements power from a utility's electrical grid 102. Solar array 115 includes a plurality of individual solar panels 115a, 115b, and up to a large number of solar panels 115n. Output power from solar array 115 interfaces with other energy resources of the DER system via the voltage conditioning-switching-distribution subsystem 116. The output of the voltage conditioning-switching-distribution subsystem 116 ultimately feeds the DC power modules 118a to 118m or provides local power to run the charging station and support facilities. Similarly, other power sources such as wind turbines 117, emergency generators (not shown), and hydro-generators 119 are connected to the voltage conditioning-switching-distribution subsystem 116 and supplement power from power grid 102. Power generated in excess of the immediate needs can be stored in the battery energy storage systems (BESS) 121 and retrieved later when needed to supplement demand. BESS 121 can be large industrial battery packs 121a, 121b to 121n composed of Li-Ion batteries, or batteries with similar capabilities, stored in special facilities. Other BESS 121 configurations can include fleet vehicles (e.g., school buses) parked when not being used or EVs parked while drivers are staying the night or resting in their vehicles.

Figure 3:
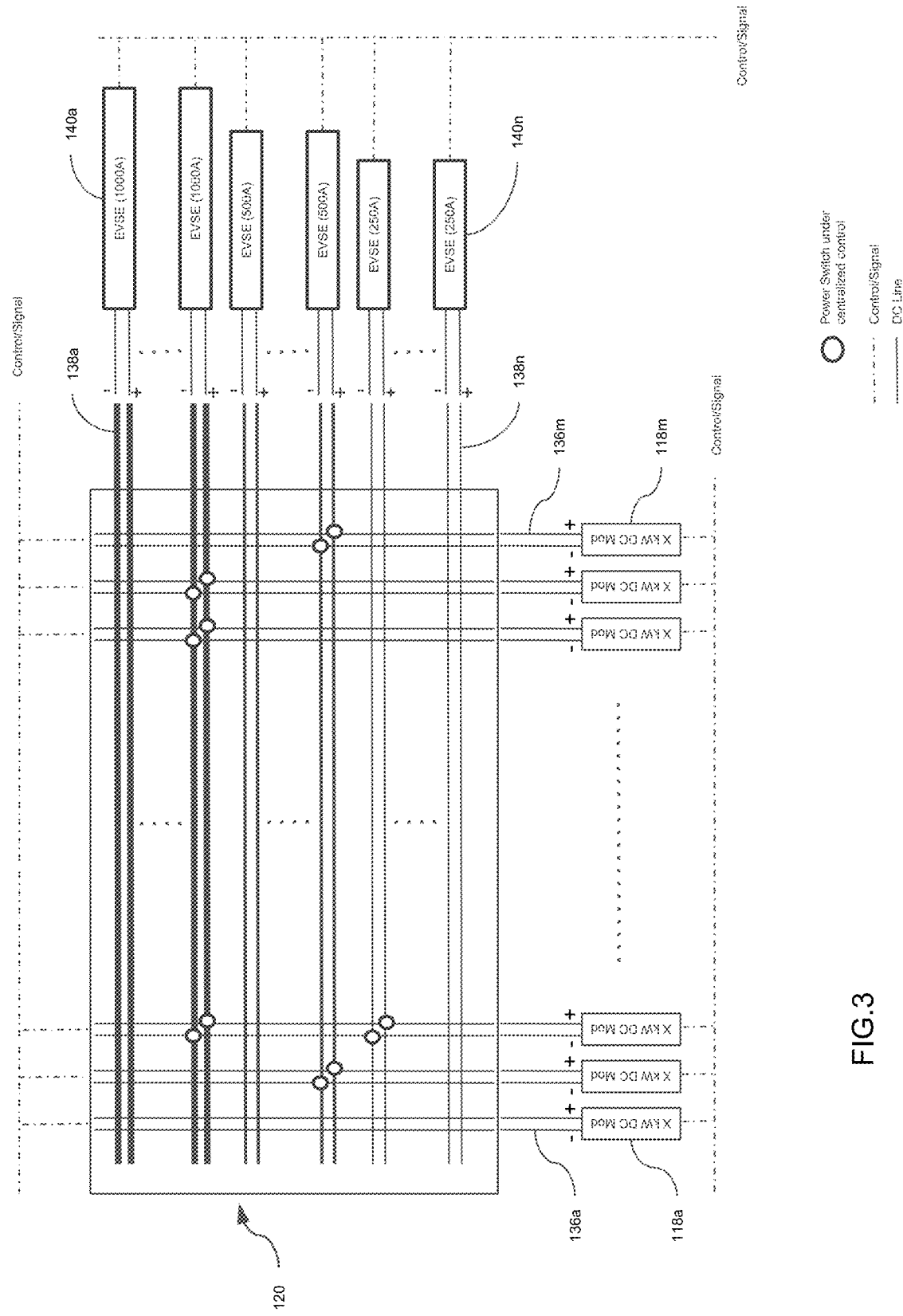
FIG. 3 shows a DC matrix power switch schematic in accordance with the present invention.

Referring to FIG. 3 and addressing the typical energy flow from the DC power modules 118a to 118m to the charge dispensers, MPS 120 in accordance with various embodiments of the invention is shown and described. MPS 120 can be used for bidirectional flow should energy be withdrawn from an EV connected to a charge dispenser and delivered to another DER system resource. MPS 120 comprises a plurality of inputs 136a to 136m, with each input consisting of a corresponding pair of dual-polarity electric lines from a DC power module 118a to 118m. MPS 120 further comprises a plurality of dual polarity outputs 138a to 138n that connect to the inputs of charge dispensers (EVSE) 140a to 140n and then connect to EVs (not shown) for charging their batteries. The dual polarity outputs 138a to 138n can connect via the electromechanical switches inside the MPS to the dual polarity inputs 136a to 136m to provide varying amounts of power as required by the EVSE 140a to 140n at the time an EV is connected for charging with a certain battery charge level.

Figure 4A:
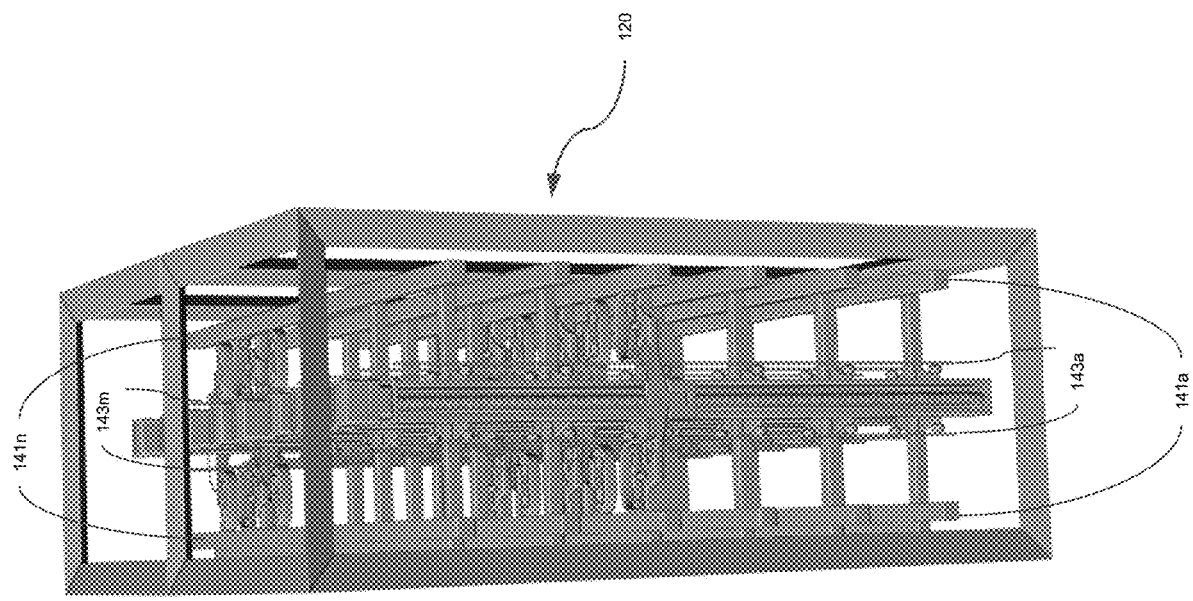
FIG. 4A shows a power switch in accordance with a first embodiment of the present invention.
Figure 5:
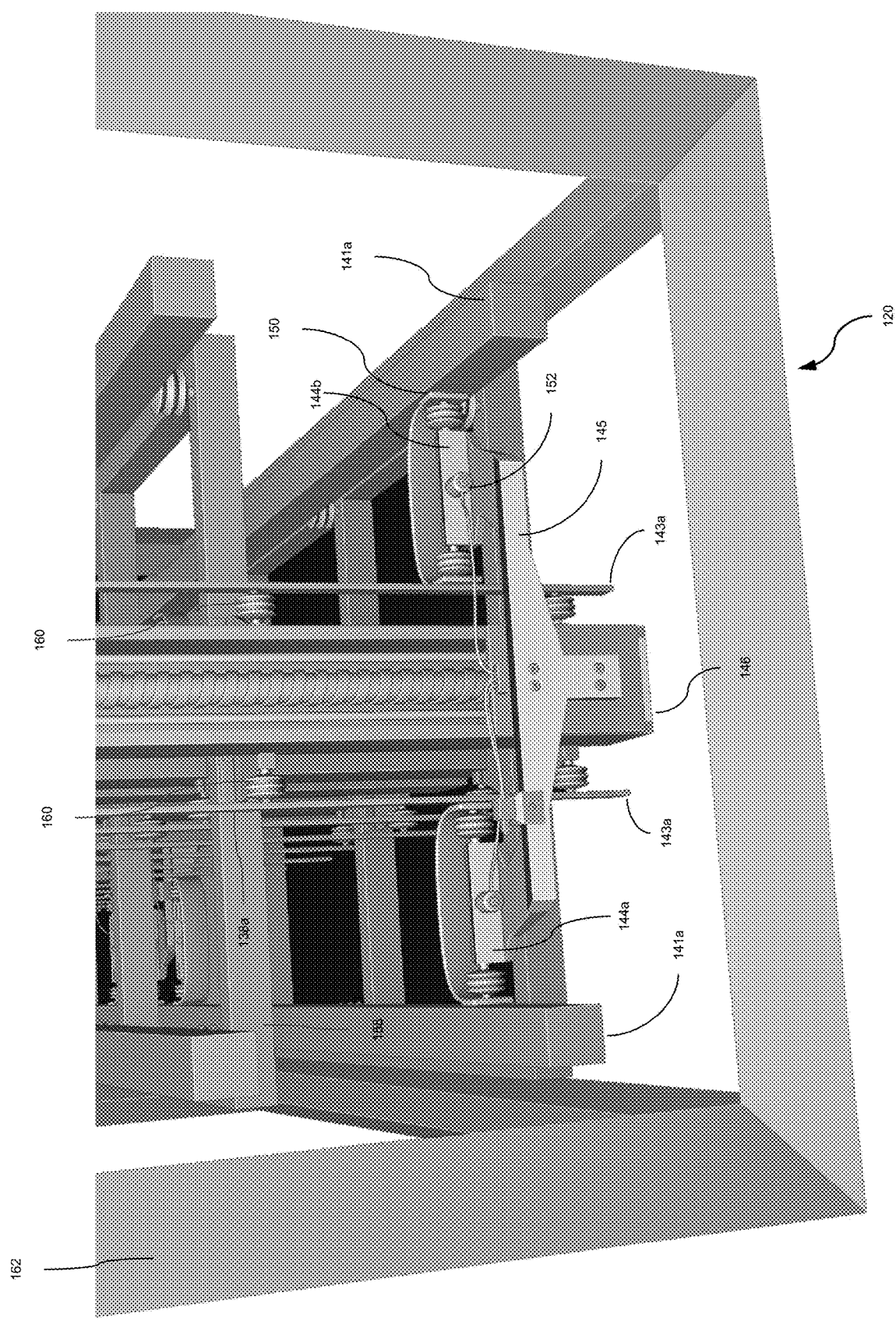
FIG. 5 shows the matrix power switch of FIG. 4A in relation to a first embodiment of the present invention.

In FIG. 4A and FIG. 5, the first embodiment of the present invention is shown, the MPS 120 comprises a plurality of horizontally-oriented dual-polarity output busbars 141a to 141n connected to one or more of the vertically-oriented dual polarity input busbars 143a to 143m by electromechanical switches 144a, 144b known as power switches positioned by motorized translation stages that travel vertically along the input busbar pair 143a to 143m. The vertical stage can position the power switches to connect a single input busbar pair 143a to a single output busbar pair 141a.

Figure 4B:
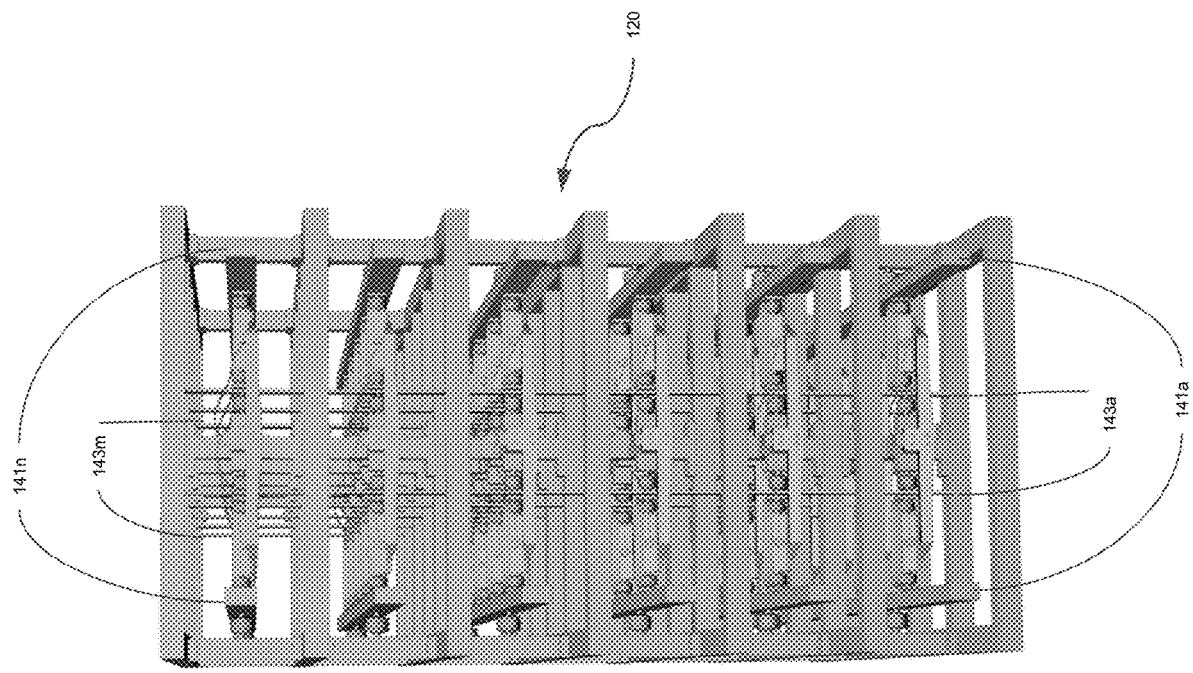
FIG. 4B shows a power switch in accordance with a second embodiment of the present invention.
Figure 6:
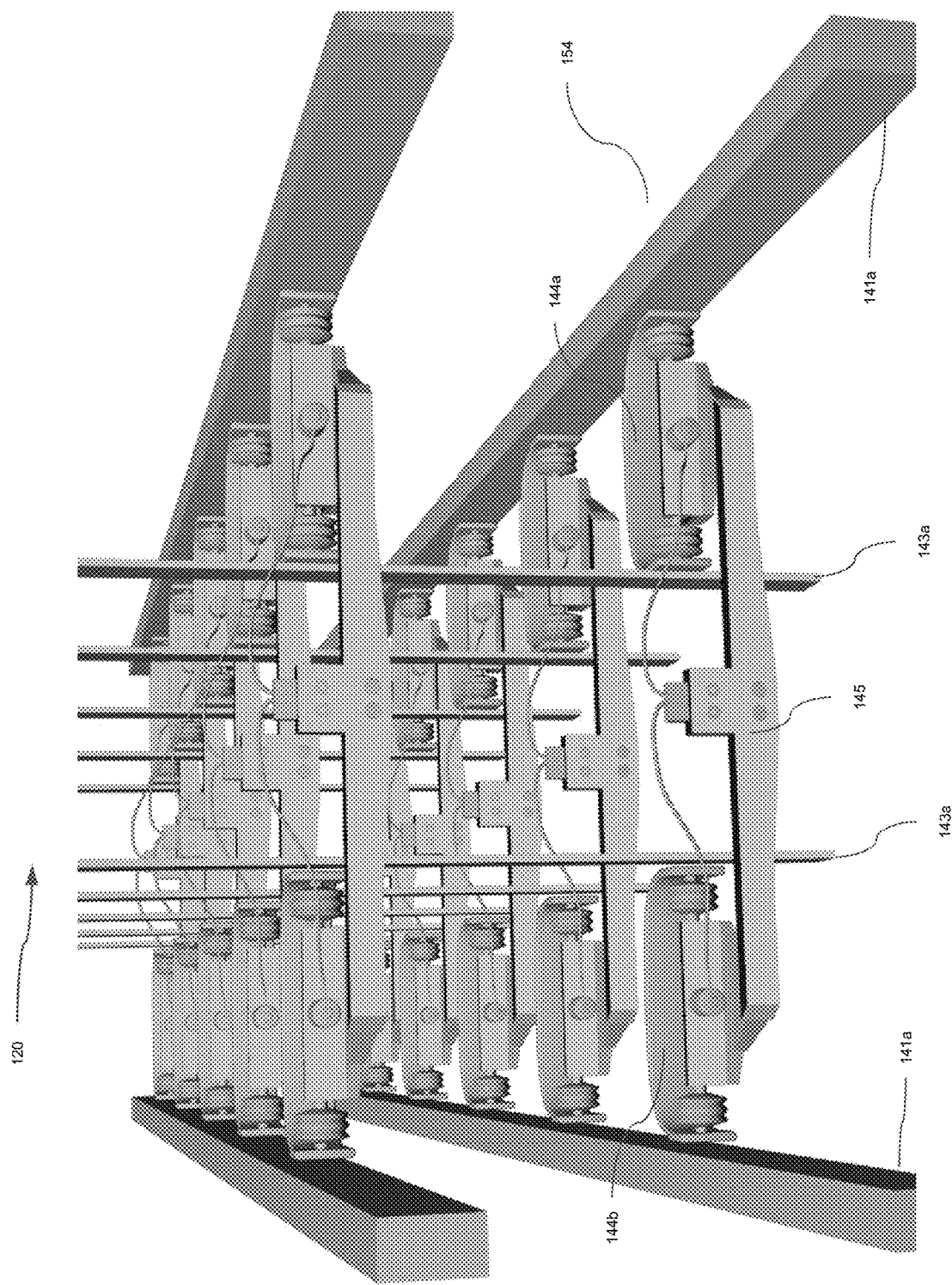
FIG. 6 shows the matrix power switch of FIG. 4B in relation to a second embodiment of the present invention.

Referring FIG. 4B and FIG. 6, a second embodiment of the present invention is shown. In this embodiment, MPS 120 comprises a plurality of horizontally-oriented dual-polarity output busbars 141a to 141n connected to one or more of the vertically-oriented dual polarity input busbars 143a to 143m by electromechanical switches 144a, 144b, known as power switches, positioned by the frame at each input busbar/output busbar crossing point 145. Since each input/output crossing point has a power switch, the configuration and connections are more varied than in the first embodiment, and a single input busbar may be connected to multiple output busbars. The result of either embodiment is to connect a plurality of outputs 141a to 141n to one or more dual-polarity input busbars 143a to 143m, providing a direct interface to the DC power modules 118a, 118m of FIG. 2. The number of input busbars, 143a to 143m, required is determined by (a) total power capacity at the charging site (the number and size of DC modules), (b) power consumption forecast, and (c) physical constraints of the charging site.

Figure 7:
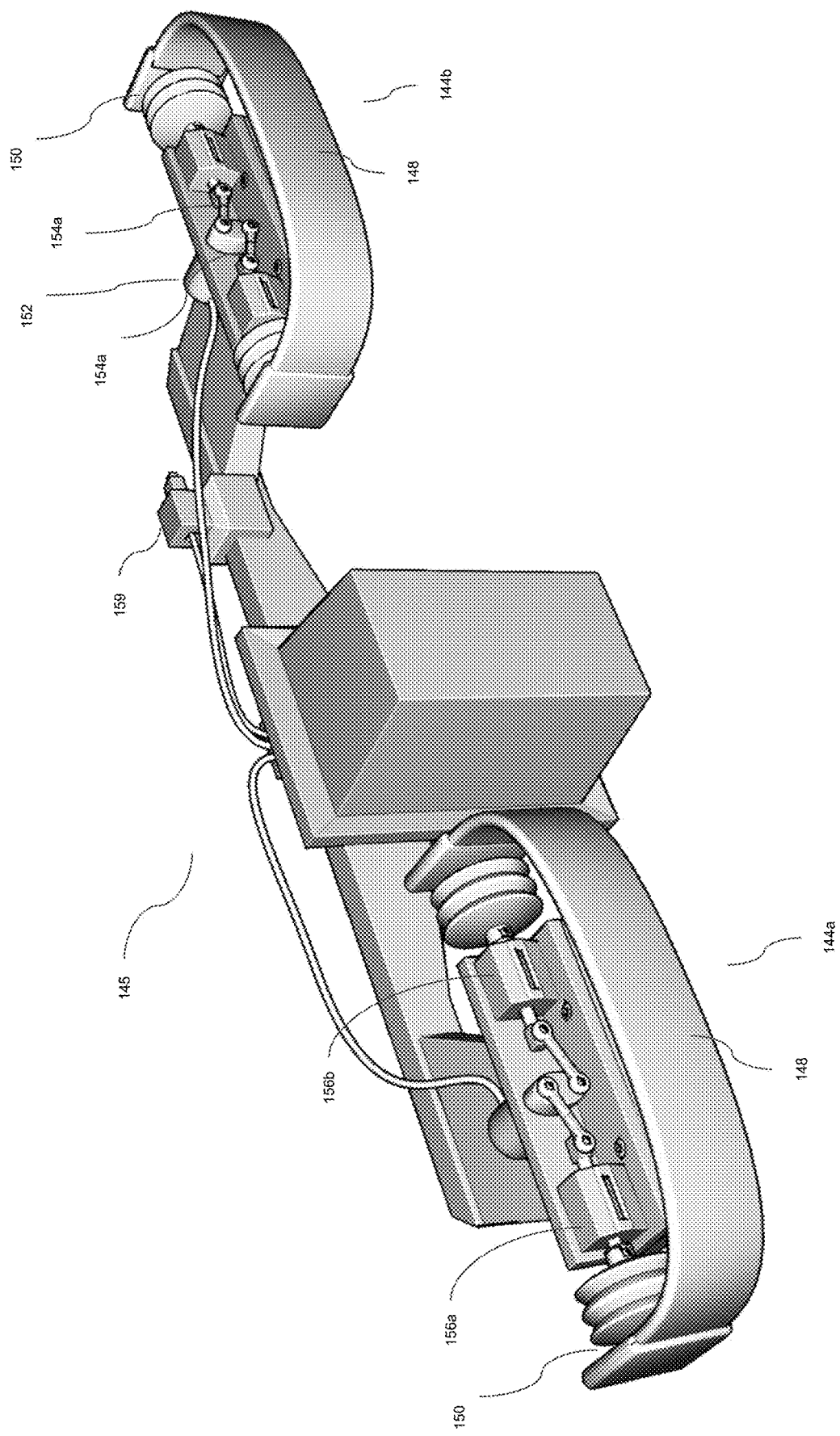
FIG. 7 shows a carriage assembly in accordance with a first embodiment of the invention.

Referring to FIG. 7, a discrete servo-actuated contacts, herein called a power switch, 144a, 144b is shown mounted on carriage assembly 145. Power switch 144a, 144b enable the electrical connectivity between each of the plurality of dual-polarity output busbars 141a to 141n of FIG. 5 (first embodiment) or FIG. 6 (second embodiment) to the plurality of input dual-polarity busbars 143a to 143m, and hence, to the DC power modules 118a to 118m of FIG. 2. Typically, a pair of power switches 144a, 144b are mounted on a carriage assembly 145 as depicted in FIG. 7. In the first embodiment, carriage assembly 145 is configured to travel along the length of dual-polarity input busbars 143a to 143m of FIG. 5 via translation stage 146 of FIG. 5 to align with the required outputs 141a to 141n, thereby forming a single connection between any one of DC power modules 118a to 118m of FIG. 2, and any one of a dual polarity inputs 143a to 143m of FIG. 5. In the second embodiment, the assembly is mounted to the frame to position the power switches 144a, 144b at one of the input busbar/output busbar crossing points 154. Additional assemblies can be mounted to the frame to cover other crossing points along the input busbar as required, eliminating the translation stage of the first embodiment.

Note that a third embodiment (not shown) can be a hybrid design combining some assemblies moved by a translation stage, as in the first embodiment, and some assemblies mounted to the frame, as in the second embodiment, as required to optimize the design.

It may be further noted that a fourth embodiment (not shown) is an m×n DC matrix power switch that connects m DC power modules to n charge dispensers for charging electric vehicles comprising an input structure having m conducting input busbar pairs, wherein a first busbar of each of m input busbar pairs is connected to a positive voltage terminal of each of said m DC power modules, wherein the second busbar of m input busbar pairs is connected to a negative voltage terminal of each of said m DC power modules, an output structure having n conducting output busbar pairs, wherein a first busbar of each of said n output busbar pairs is connected to a positive voltage terminal of each of said n charge dispensers, wherein a second busbar of each of said n output busbar pairs is connected to a negative voltage terminal of each of said n charge dispensers, wherein said input structure and said output structure are arranged to form an m by n crossing busbar pairs corresponding to two times m by n busbar crossing points, a dual-axis translation stage assembly that interfaces with each of said m by n busbar pair crossing points, wherein said m power switch assemblies comprises of two power switches, wherein each said power switch assembly can be individually positioned and attached to said matrix power switch structure and released by said dual-axis translation stage assembly at each of said m by n busbar pair crossing points, wherein when released by said dual-axis translation stage, said power switch assembly remains attached to said matrix power switch structure and wherein said dual-axis translation stage becomes available to grab a next power switch assembly for positioning, wherein said dual-axis translation stage assembly can remove an attached power switch assembly and reposition said assembly to another busbar crossing point or park said assembly in an inactive position, a communication link to send commands to activate or deactivate each of said attached power switch assembly, wherein when activated, said power switch assembly connects to its associated busbar pairs at said busbar pair crossing points, wherein connections are made between said busbar pairs such that current flows from positive to negative when said DC power modules are active and the said dispensers are charging a vehicle, and when power is removed from said power switch, or when said power switch receives a command to deactivate, said connection between said associated input and said output busbars is terminated.

Referring still to FIG. 7, each carriage assembly 145 comprises of a pair of power switches 144a, 144b wherein each power switch 144a or 144b handles a single polarity connection at the input busbar/output busbar crossing point of the dual-polarity busbars.

In all preferred embodiments of the present invention, each power switch 144a, 144b of FIG. 7 comprises a braided copper strap contact 148 that can be connected across the air gaps 150 to connect input busbars to output busbars. Airgap 150 must be designed to prevent arcing when not connected. In addition, when connections are made, the connections are not "hot," and all associated busbars are switched off before connecting to avoid arcing and damaging contacts. Furthermore, for the first embodiment, where the translation stage may move contacts past busbars that are "hot," care to keep the air gap 150 sufficiently large is important.

Each power switch 144a, 144b of FIG. 7 comprises a servo motor 152 that includes a pair of crankshaft actuators 154a, 154b that push braided copper strap contacts 148 against a corresponding dual-polarity output busbar 141a to 141n and a dual-polarity input 143a to 143m. Braided copper strap contacts 148 have a spring-loaded mechanism 156a, 156b that provides for articulation between a contact position and a non-contact position. Spring-loaded mechanism 156a, 156b compensates for any distance differences in the gaps between braided copper strap contacts 148 and the dual-polarity busbars.

Dual-polarity input busbars 143a to 143m are structurally supported by corresponding non-conductive brackets 158 as shown in FIG. 5 and attached to said brackets by electrical insulators 160. The busbars for dual-polarity outputs 141a to 141n are structurally supported by non-conductive brackets and electrical insulators attached to the same brackets 158 of FIG. 5. Brackets 158 are attached to a metallic structure 162 that encloses matrix power switch 120. In the first embodiment, each carriage assembly contains a position sensor 159 as shown in FIG. 7 that determines the exact position of carriage assembly 145 to facilitate the positioning of the associated power switch to the crossing point. Position sensor 159 is not used in the second embodiment since each crossing point has a power switch positioned by the assembly in the correct position.

Figure 8:
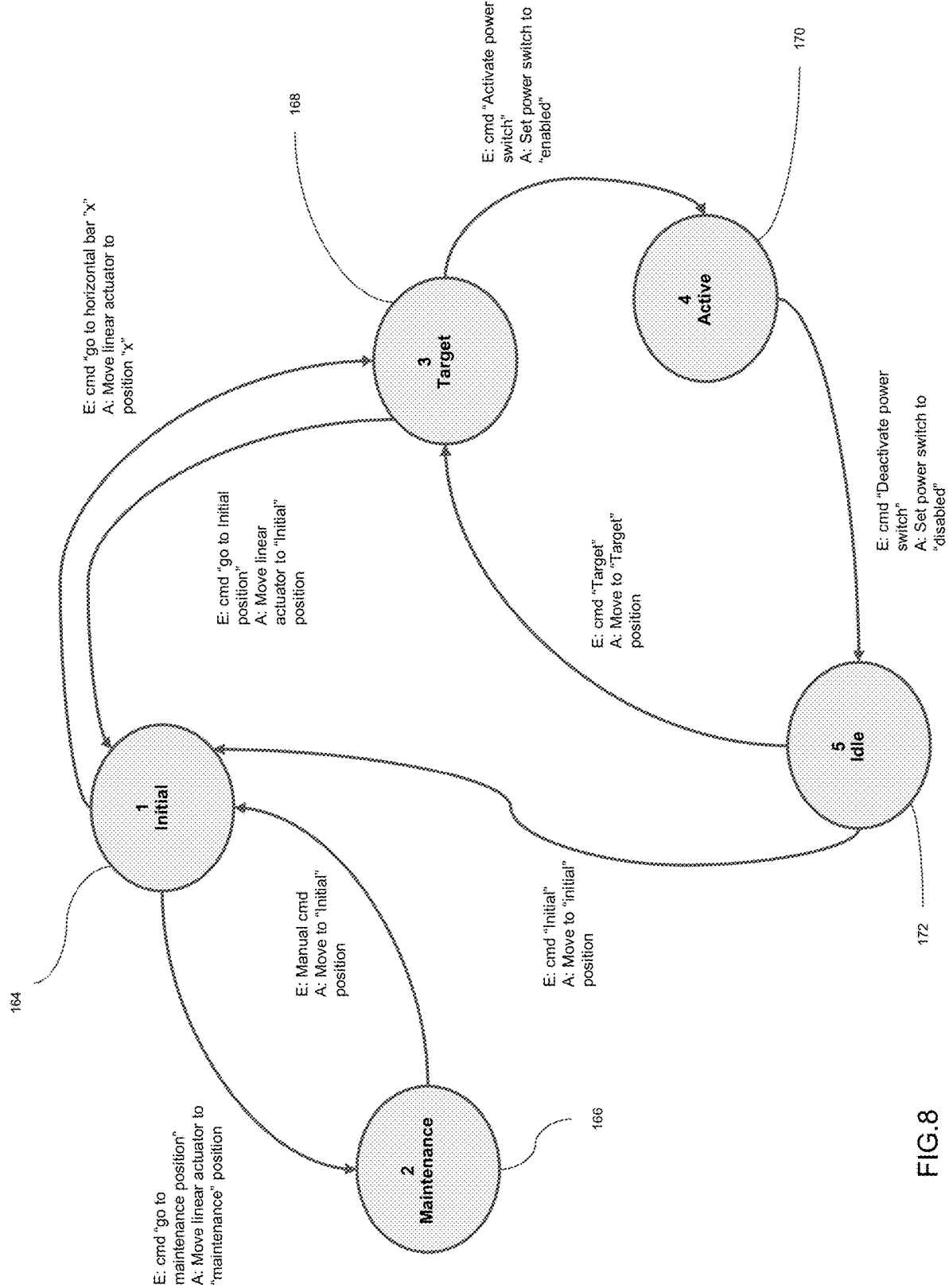
FIG. 8 shows the various states of a carriage assembly in accordance with a first embodiment of the present invention.

In the first embodiment and referring to FIG. 8, assembly 145 of FIG. 7 can be in any one of the following states: (1) initial 164; (2) maintenance or service 166; (3) target 168; (4) active 170; and (5) idle or off 172. Assembly 145 of FIG. 5 in combination with the translation stage, is calibrated to establish the service/maintenance position 166 of FIG. 5 and initial positions 164 such that it moves vertically and relies on position sensor 159 of FIG. 7 to stop at its targeted position. The position sensor 159 can be optical or magnetic-based. An optical sensor can read busbar location from the visual structure or from an optical encoder. A magnetic position sensor can read a magnetic encoder. Power switch 120 of FIG. 4 can be in either an enabled or disabled state.

For both embodiments, once power switch 145 is enabled, it can only change state once the respective DC power module is in the idle or off state 172. Power switches are not to be connected or disconnected when busbars are hot.

The centralized management system 124 of FIG. 2 controls the matrix power switch 120 through programmable logic. As an example, for the first embodiment, translation stage 146 of FIG. 5 is commanded to change state based on its current state. A command to a target position is based on the following two criteria: (1) current position; and (2) average usage. These two criteria allow for minimizing the travel distances of assembly 144 of FIG. 5 while balancing the usage of each one of the translation stages 146 of FIG. 5. The benefit realized is to minimize the time required to engage DC power modules 118a and 118m of FIG. 3 and reduce the frequency of repair, extending the Mean Time to Repair (MTTR) of mechanical and electrical systems.

Figure 9:
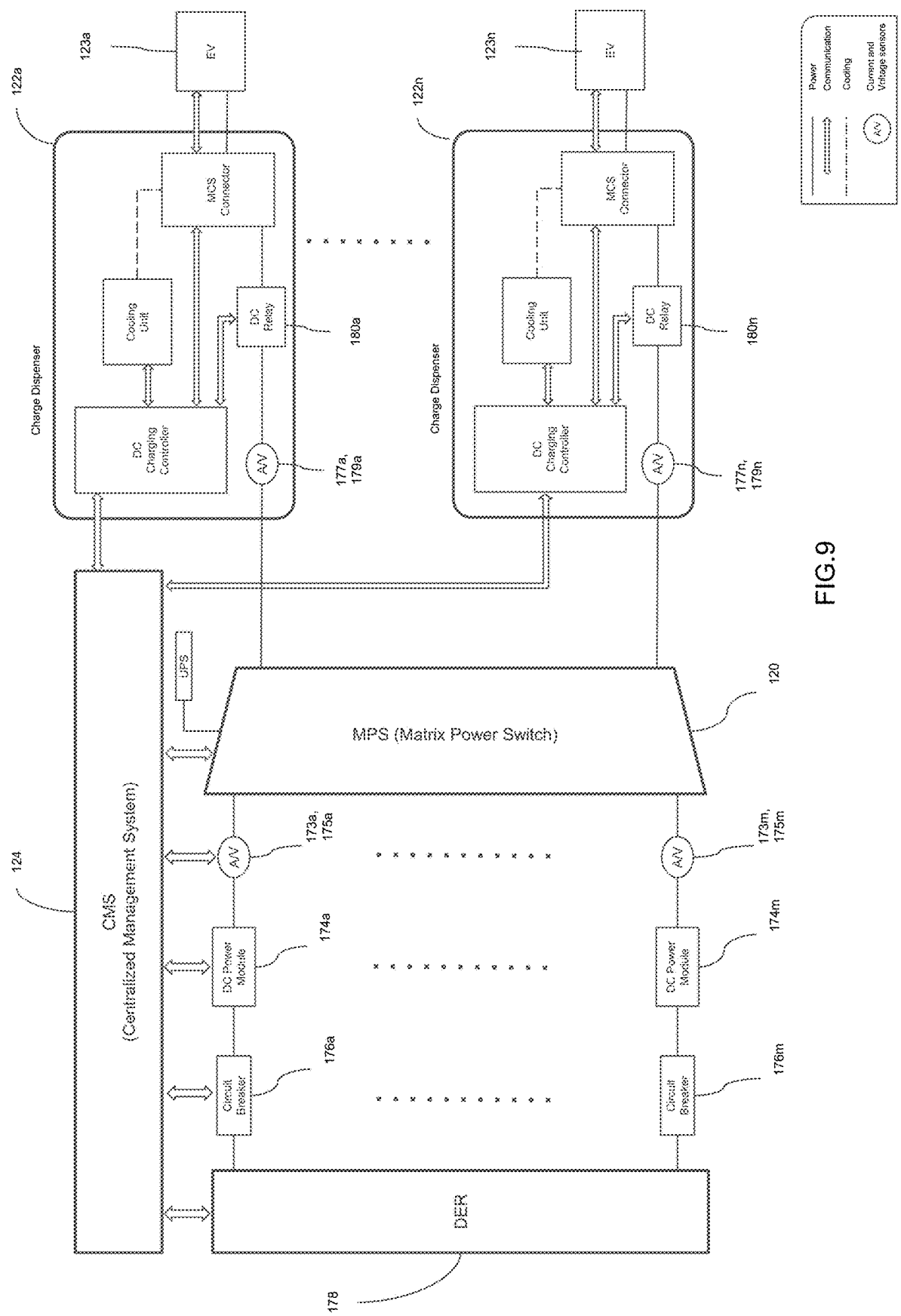
FIG. 9 shows the relationship between the matrix power switch and associated components in accordance with the present invention.

Referring to FIG. 9, voltage sensors 173a, 173m and current sensors 175a, 175m positioned between DC power modules 174a, 174m and DC matrix switch 120 of FIG. 2 allow centralized management system 124 to guarantee the target DC power module is idle/off before commanding MPS 120 to make contact with dual-polarity busbars. Centralized management system 124 relies on feedback from another set of voltage sensors 177a, 177n and current sensors 179a, 179n in charge dispensers 122a, 122n of FIG. 9 to guarantee that dual-polarity busbars are not energized either from other DC power modules or from the electric vehicle 123a, 123n of FIG. 8 in a bi-directional configuration—DER system to vehicle or vehicle to the DER system.

Centralized management system 124 controls circuit breakers 176a, 176m of FIG. 9 between the DER 178 and the DC power modules 174a to 174m. Circuit breakers 176a to 176m are either manually controlled for maintenance purposes or automatically triggered by potentially dangerous circumstances to force the turning off of DC power modules 174a to 174m. Centralized management system 124 can also control DC relays 180a to 180n of FIG. 9 in charge dispensers 122a to 122n to disconnect its power either through a manual command or during service/maintenance, automatically under special circumstances, or fault and/or error scenarios.

Figure 10:
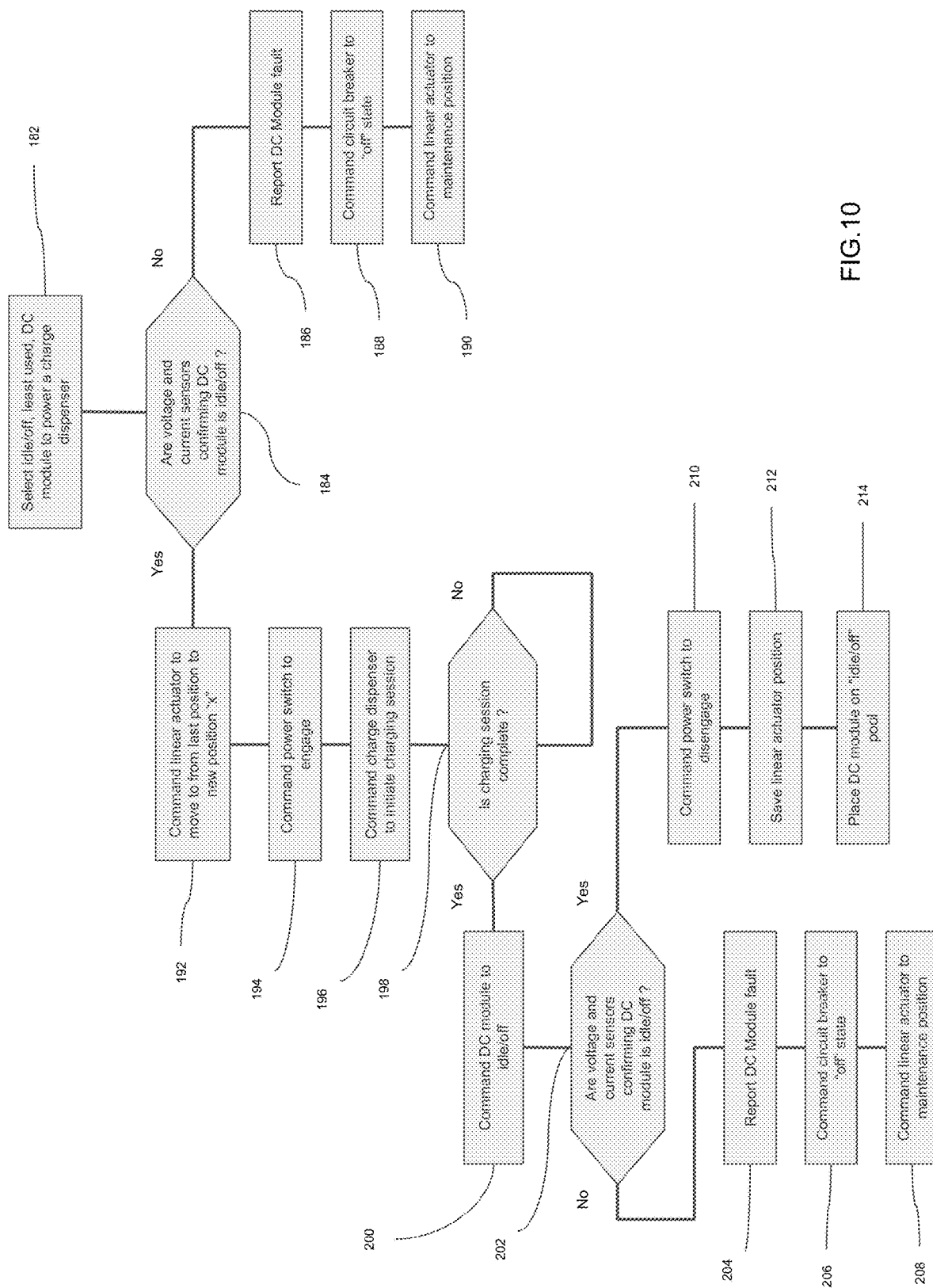
FIG. 10 shows a process control during a charging session.

Referring to FIG. 10 and to the first embodiment, a process for centralized management system 124 of FIG. 2 control of powering charge dispensers during a charging session in accordance with an embodiment of the present invention is disclosed. The process starts by selecting the idle/off least used DC power module to charge a dispenser 182. Do voltage and current sensors confirm DC module is idle/off ? 184. If the DC module is not idle/off (NO), then a DC module fault is reported 186. The circuit breaker is commanded to OFF state 188. Finally, the carriage assembly is set to maintenance/idle condition 190.

Referring still to FIG. 10 and to the first embodiment, if the DC module is idle/off (YES), then the carriage assembly is commanded to move from the last position to a new position "x" 192. The power switch is engaged 194. The charge dispensers are commanded to initiate charging 196. After charging has been initiated, an inquiry on whether charging is complete 198. If charging is NOT complete, this step is repeated until charging is complete. At which time the DC module is commanded to idle/off 200. Voltage and current sensors then confirm whether the DC module is idle/off 202. If the DC module is NOT off, then a DC module fault is reported 204. In this situation, the circuit breaker is commanded to OFF state 206. Finally, the carriage assembly is set to maintenance/idle condition 208. Back at step 202, if DC module is off, the power switch is disengaged 210, the assembly position is saved 212, and the DC power module is placed in idle/off position 214.

FIG. 10 largely applies to the second embodiment except that motion commands to position the switch at an affected crossing point are replaced with power switch commands related to the switch located at the crossing point being affected.

Figure 11:
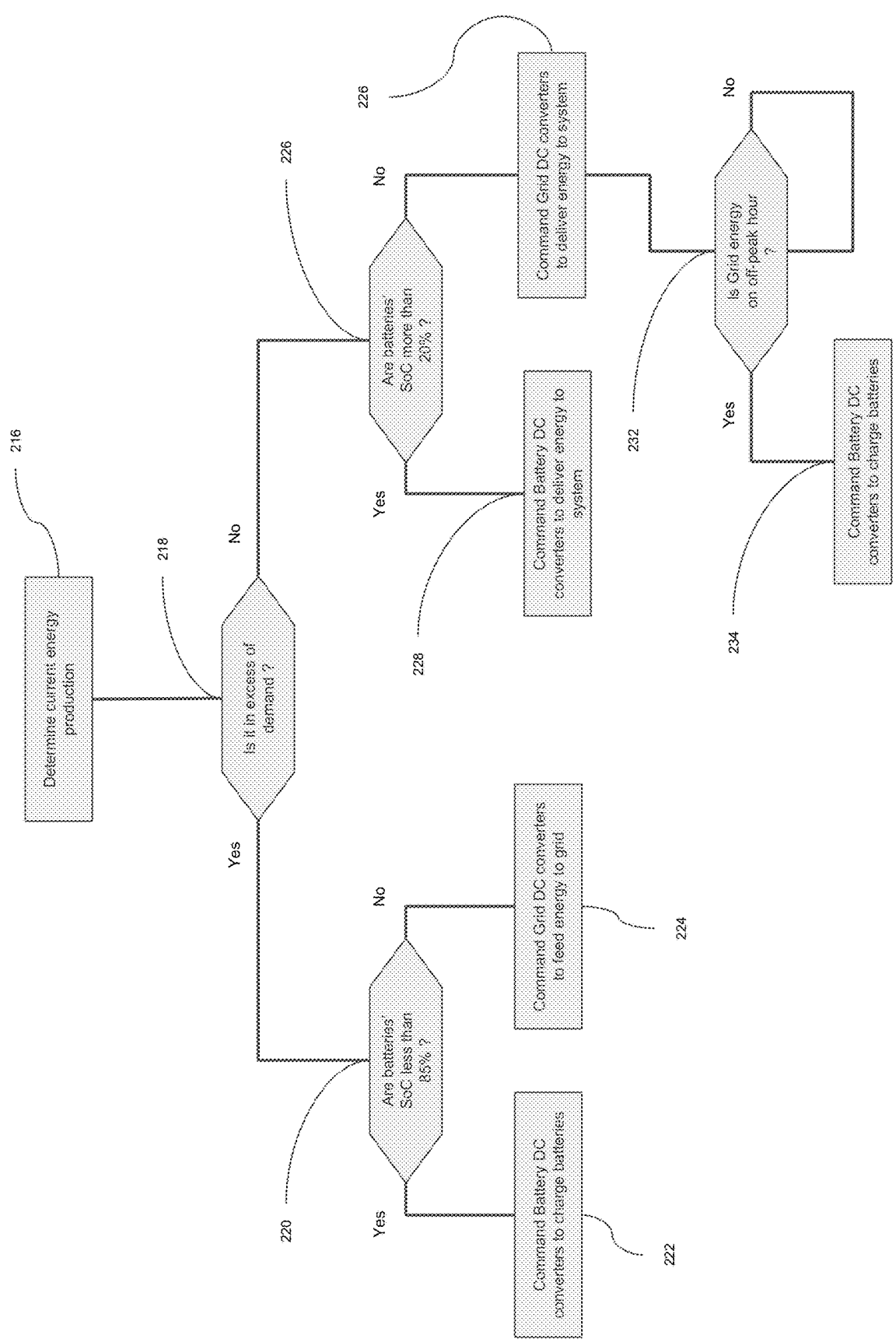
FIG. 11 shows a process for determining current energy production.

Referring to FIG. 11 and to both embodiments, process 216 is performed regularly and, in some cases, in real-time to determine whether the renewable energy production forecast exceeds the actual or forecasted consumption by energy dispensers. The initial step of the process is inquiring whether the current energy production exceeds demand 218. If the current energy production exceeds demand=YES, then the inquiry is whether the BESS level is less than approximately 85%, as shown in step 220. (Note: the battery levels are modeled after a typical Li-Ion battery. The real implementation using an actual battery may have different thresholds, and those thresholds may be learned and adapted over time.) If the BESS level is less than approximately 85%, the battery charge command is initiated, as shown in step 222. If the BESS level is NOT less than approximately 85%, then the DER DC converters are commanded to supply energy to the utility power grid 102, as shown in step 224. Reverting to step 218, if the current energy production exceeds demand=NO, then the inquiry is whether the BESS level is greater than approximately 20%, as shown in step 226. If the BESS level is greater than approximately 20%, then a command to deliver energy to the DER system is given, as shown in step 228. If the BESS level is NOT greater than approximately 20%, then a command for the DER system DC converters to supply energy to the BESS is initiated, as shown in step 226. If a command for the DER DC converters to supply energy to the system is initiated, as shown in step 226, an inquiry on whether the utility power grid is operating off-peak hours is made, as shown in step 232. If the inquiry on whether the utility power grid is operating off-peak hours=YES, then the BESS charge command is initiated and power is drawn from the utility power grid, as shown in step 234

Figure 12:
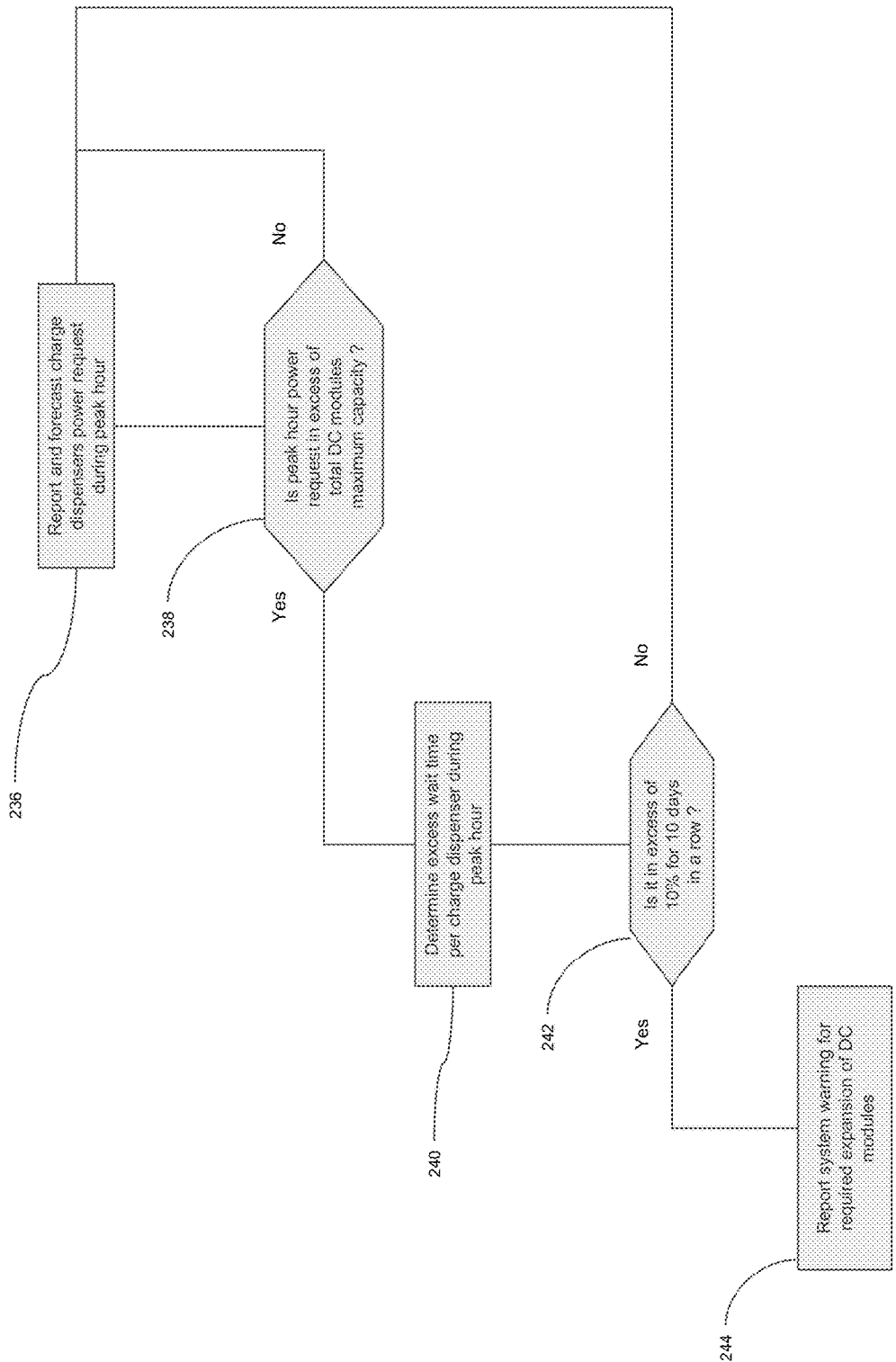
FIG. 12 shows a flowchart for determining renewal energy production forecast and consumption.

Referring to FIG. 12, a report and forecast charge dispenser power request during peak hour 236 is described. If the peak hour request is in excess of DC power module capacity 238, then the excess wait time per charge dispenser during peak hour is determined 240. If excess wait time per charge dispenser during peak hour is in excess of 10% for 10 days in a row 242, a report for system warning for required expansion of DC power module is provided 244.

MPS 120 disclosed herein achieves cost savings by lowering the requirements of some electrical components when certain operational assumptions are true, such as establishing electrical contact exclusively under idle/off-load conditions.

MPS 120 disclosed herein includes an uninterruptable power supply (UPS) to allow its safe operation and shutdown in the event of a power interruption. In addition, the MPS is critical to operating the charge dispenser systems and has electromechanical parts that will need maintenance for continued safe operation. Therefore, the system may incorporate predictive maintenance software and sensors to identify and predict failures so maintenance can be scheduled and downtime can be minimized or avoided. Sensors that measure and locate temperature and vibration anomalies are expected to be installed. Examples of such systems are thermal imagers, discrete temperature sensors systems, and discrete and arrays of vibration sensors combined with vibration analysis software.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing the present teachings. Additionally, the described implementation includes software, but the present teachings may be implemented as a combination of hardware and software or in hardware alone. The present teachings may be implemented with both object-oriented and non-object-oriented programming systems.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A DC matrix power switch (m×n matrix) that mechanically and electrically connects m DC power modules to n charge dispensers for charging electric vehicles comprising:

an input structure having one or more input busbar pairs wherein the one or more input busbars pairs are generally parallel and straight electrical conductors whose cross-section and conductivity are configured for a maximum input current consistent with a DC power module output, and wherein the one or more input busbar pairs are aligned and fixed parallel to each other thereby forming the input structure of parallel busbars;

wherein the first busbar of the input busbar pair is associated with a positive voltage and has an attachment mechanism for allowing the connection of the positive voltage terminal of the DC power module and the passage of the maximum output current of the DC power module;

wherein the second busbar of the input busbar pair is associated with a negative voltage and has an attachment mechanism for allowing the connection of the negative voltage terminal of the DC power module and the passage of the maximum output current of the DC power module;

wherein the current flows from the positive to the negative voltage busbars;

wherein an output structure including one or more output busbar pairs wherein the output busbars pairs are electrical conductors whose cross-section and conductivity are designed for a maximum output current consistent with a charge dispenser's maximum current demand, and the one or more output busbar pairs are aligned and fixed parallel to each other thereby forming the output structure of parallel busbars;

wherein the first busbar of the output busbar pair is associated with a positive voltage and has an attachment mechanism to allow the connection of the positive voltage terminal of the charge dispenser and the passage of the charge dispenser's maximum current demand;

wherein the second busbar of the output busbar pair is associated with a negative voltage and has an attachment mechanism to allow the connection of the negative voltage terminal of the DC power module and the passage of the charge dispenser's maximum current demand;

wherein the current flows from the positive to the negative voltage busbars;

a power switch comprising one or more actuators to mechanically and electrically connect an input busbar to an output busbar with a flexible conductor configured to carry at least the maximum current of the DC power module;

a translation stage assembly for each input busbar pair further comprising:

a translation stage;

a power switch assembly that positions and secures two power switches to the translation stage such that the power switches can be aligned to the orthogonal input and output busbars near their crossing point, and when the power switches are actuated, the power switches connect the positive voltage input busbar to the positive output busbar of the crossing busbar pairs, wherein when the power switches are not actuated, or power to the power switches is lost, the busbars are not connected; and an alignment structure to support and position the input structure relative to the output structure in a matrix such that the input busbar pairs are orthogonal to the output busbar pairs and to support and attach the translation stage assemblies along with each input busbar pair so that translation movement is parallel to the input busbar pair and traverses a distance that accesses crossing output busbar pairs, thereby allowing the power switch assembly to make connections between input and output busbar pairs.

2. The DC matrix power switch of claim 1 wherein the power to operate the DC matrix power switch, including at least the power to the actuators and translation stages, includes an uninterruptible power supply configured to provide at least enough power to safely shut down the switch in the event of a power interruption.

3. The DC matrix power switch of claim 1 wherein position sensors are used to determine the location of the power switches within the matrix before the connections are made between the selected busbar pairs.

4. The DC matrix power switch of claim 1 wherein a temperature monitoring safety and predictive maintenance system is incorporated to determine the health of the matrix power switch and whether all or parts of the switch should be shut down, scheduled for maintenance or temperature controlled to maintain proper operational characteristics.

5. The DC matrix power switch of claim 1 wherein a vibration monitoring safety and predictive maintenance system is incorporated to determine the health of the matrix power switch and whether all or parts of the switch should be shut down or scheduled for maintenance to maintain proper operational characteristics.

6. The DC matrix power switch of claim 1 wherein the power flow is reversed so that power flows from charge dispensers back towards the DER system.

7. The DC matrix power switch of claim 1, combined in a hybrid configuration where some connections are made using translation stage positioned power switches and other connections are made from fixed power switches located at input/output busbar crossing points.

8. The DC matrix power switch of claim 1, wherein the one or more actuators of the power switch comprise a servo motor that includes a pair of crankshaft actuators that push the flexible conductor to connect an input busbar to an output busbar.

9. The DC matrix power switch of claim 8, wherein the flexible conductor comprises a braided copper strap contact.

10. The DC matrix power switch of claim 9, wherein the braided copper strap contact comprises a spring-loaded mechanism that provides for articulation between a contact position and a non-contact position.

\* \* \* \* \*